United States Patent
Majak et al.

(10) Patent No.: US 10,841,718 B2
(45) Date of Patent: Nov. 17, 2020

(54) ACOUSTIC TESTING APPARATUS

(71) Applicant: Tymphany Acoustic Technology (Huizhou) Co., Ltd., Huizhou (CN)

(72) Inventors: Daniel James Majak, Huizhou (CN); Ruzhou Zhu, Huizhou (CN)

(73) Assignee: TYMPHANY ACOUSTIC TECHNOLOGY (HUIZHOU) CO., LTD., Huizhou (CN)

( * ) Notice: Subject to any disclaimer, the term of this patent is extended or adjusted under 35 U.S.C. 154(b) by 0 days.

(21) Appl. No.: 16/529,282

(22) Filed: Aug. 1, 2019

(65) Prior Publication Data
US 2020/0053495 A1    Feb. 13, 2020

Related U.S. Application Data

(60) Provisional application No. 62/717,276, filed on Aug. 10, 2018.

(51) Int. Cl.
*H04R 29/00* (2006.01)
*G01H 17/00* (2006.01)

(52) U.S. Cl.
CPC ........... *H04R 29/004* (2013.01); *G01H 17/00* (2013.01); *H04R 29/001* (2013.01)

(58) Field of Classification Search
CPC ..... H04R 29/001; H04R 29/004; G01H 17/00
USPC ..................................................... 381/58, 56
See application file for complete search history.

(56) References Cited

U.S. PATENT DOCUMENTS

| | | | |
|---|---|---|---|
| 2007/0217618 A1* | 9/2007 | Yang | H04R 29/001 381/58 |
| 2015/0264501 A1* | 9/2015 | Hu | H04R 29/00 381/58 |
| 2019/0128037 A1* | 5/2019 | Kuo | E05F 5/08 |
| 2019/0183112 A1* | 6/2019 | Fick | G08C 17/02 |
| 2020/0024845 A1* | 1/2020 | Hakuta | B32B 15/04 |

* cited by examiner

*Primary Examiner* — Ammar T Hamid
(74) *Attorney, Agent, or Firm* — Muncy, Geissler, Olds & Lowe, P.C.

(57) ABSTRACT

An acoustic testing apparatus includes a box body, a machine frame, a door frame, a door body, a rotary mechanism and linear displacement mechanisms. The box body has a feed-discharge port. The machine frame has a first opening and a second opening opposite to each other, and is disposed on the box body. The first opening communicates with the feed-discharge port. The door frame is disposed on the machine frame. The door body is disposed on the door frame. The rotary mechanism is disposed on the door frame and is connected to the door body to drive the door body to rotate. The linear displacement mechanisms are disposed on the machine frame and are connected to the door frame to drive the door frame to displace between the first opening and the second opening linearly, thus delivering an object to come in and out of the box body.

12 Claims, 5 Drawing Sheets

ACOUSTIC TESTING APPARATUS

CROSS REFERENCE TO RELATED APPLICATIONS

This application claims priority of U.S. Provisional Application No. 62/717,276 filed on Aug. 10, 2018 under 35 U.S.C. § 120, the entire contents of all of which are hereby incorporated by reference.

TECHNICAL FIELD

The present invention relates to an acoustic testing apparatus, and in particular, to an acoustic testing apparatus for testing an audio module or horn system finished product.

BACKGROUND

FIG. 1 is a schematic diagram of a general audio module tester 9. The general audio module tester 9 mainly includes a test box 91. The test box 91 is provided with a feed-discharge port 911, and a box body door 912 capable of sealing the feed-discharge port 911. The box body door 912 may be displaced linearly to be relatively far away from or close to the test box 91. When the box body door 912 is displaced linearly to be far away from the test box 91, the feed-discharge port 911 of the test box 91 is opened to place a to-be-tested object into the test box 91 or take the to-be-tested object out of the test box 91. After the to-be-tested object is placed into the test box 91, and the box body door 912 is displaced linearly to be close to the test box 91 and seal the feed-discharge port 911, the to-be-tested object is subject to an audio test in the test box 91.

In general, the manner for placing the to-be-tested object into the test box 91 or taking the to-be-tested object out of the test box 91 is completed by an operator manually, so after the to-be-tested object is placed into the test box 91, it is essential to wait for the to-be-tested object to complete the audio test and then take out the to-be-tested object. Hence, when the audio test is carried out on the to-be-tested object, the operator responsible for feeding and discharging is in an idle state. When the operator feeds and discharges the to-be-tested object, the test box 91 is in an idle state. Therefore, the general audio module tester 9 still has a space for improving the staff or test efficiency in test work.

SUMMARY OF THE INVENTION

In view of the above problems with conventional devise, the present invention provides an acoustic testing apparatus. The acoustic testing apparatus provided by the present invention includes a box body, a machine frame, a door frame, a door body, a rotary mechanism and a linear displacement mechanism. The box body has a feed-discharge port. The machine frame has a first opening and a second opening opposite to each other. The machine frame is disposed on the box body and the first opening communicates with the feed-discharge port. The door frame is disposed on the machine frame. The door body is disposed on the door frame. The rotary mechanism is disposed on the door frame and is connected to the door body to drive the door body to rotate. The linear displacement mechanism is disposed on the machine frame and is connected to the door frame to drive the door frame to displace between the first opening and the second opening linearly, thus delivering a to-be-tested object to come in and out of the box body from the feed-discharge port.

In an embodiment, the rotary mechanism includes a rotating shaft and a drive source, and the rotating shaft is connected to the drive source and the door body.

In an embodiment, the drive source is an alternating-current servo motor.

In an embodiment, each linear displacement mechanism includes a pressure cylinder; and the pressure cylinders are connected to the door frame.

In an embodiment, each linear displacement mechanism includes a linear slide rail and a linear slide block; the linear slide rails are disposed on the machine frame; the linear slide blocks are sleeved to the linear slide rails in a penetration manner; the pressure cylinders are connected to the door frame; and the door frame is connected to the linear slide blocks.

In an embodiment, the acoustic testing apparatus includes two carrying platforms, respectively disposed at two opposite sides of the door body.

In an embodiment, the acoustic testing apparatus includes two clamping tools, respectively disposed on the two carrying platforms.

In an embodiment, the door body is formed by a plurality of material layers by overlapping.

In an embodiment, the plurality of material layers include a dense plate layer, a glass fiber layer and a cotton layer.

In an embodiment, the acoustic testing apparatus includes buffers, disposed on the door frame.

In an embodiment, each buffer includes a body and an axle center; a buffer medium is accommodated in each body; and one end of each axle center is stretched into the body to contact the buffer medium, and the other end of each axle center is stretched out of the body and faces to the machine frame.

In an embodiment, the buffer media each is a spring, a gas or a liquid.

In conclusion, according to the acoustic testing apparatus provided by the present invention, the to-be-tested object may be fed and discharged in the process when the test work is performed, and thus the use efficiency is improved.

DETAILED DESCRIPTION OF THE EMBODIMENTS

For the ease of reading, the "upper," "lower," "left" and "right" indicated in the figures are to indicate a reference relative position of each component and are not intended to limit the present invention.

Figure 1:
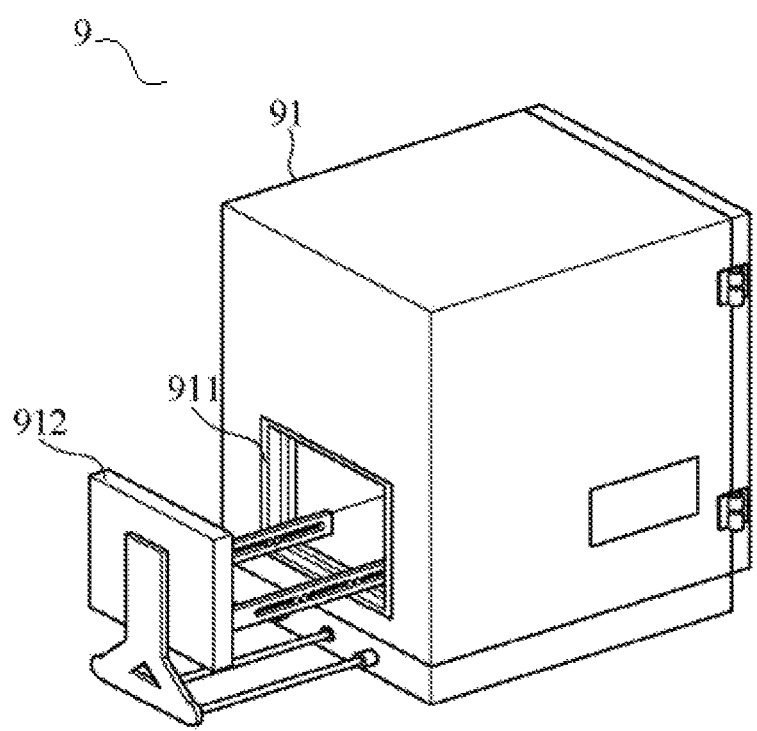
FIG. 1 is a schematic diagram of a general audio module tester.
Figure 2:
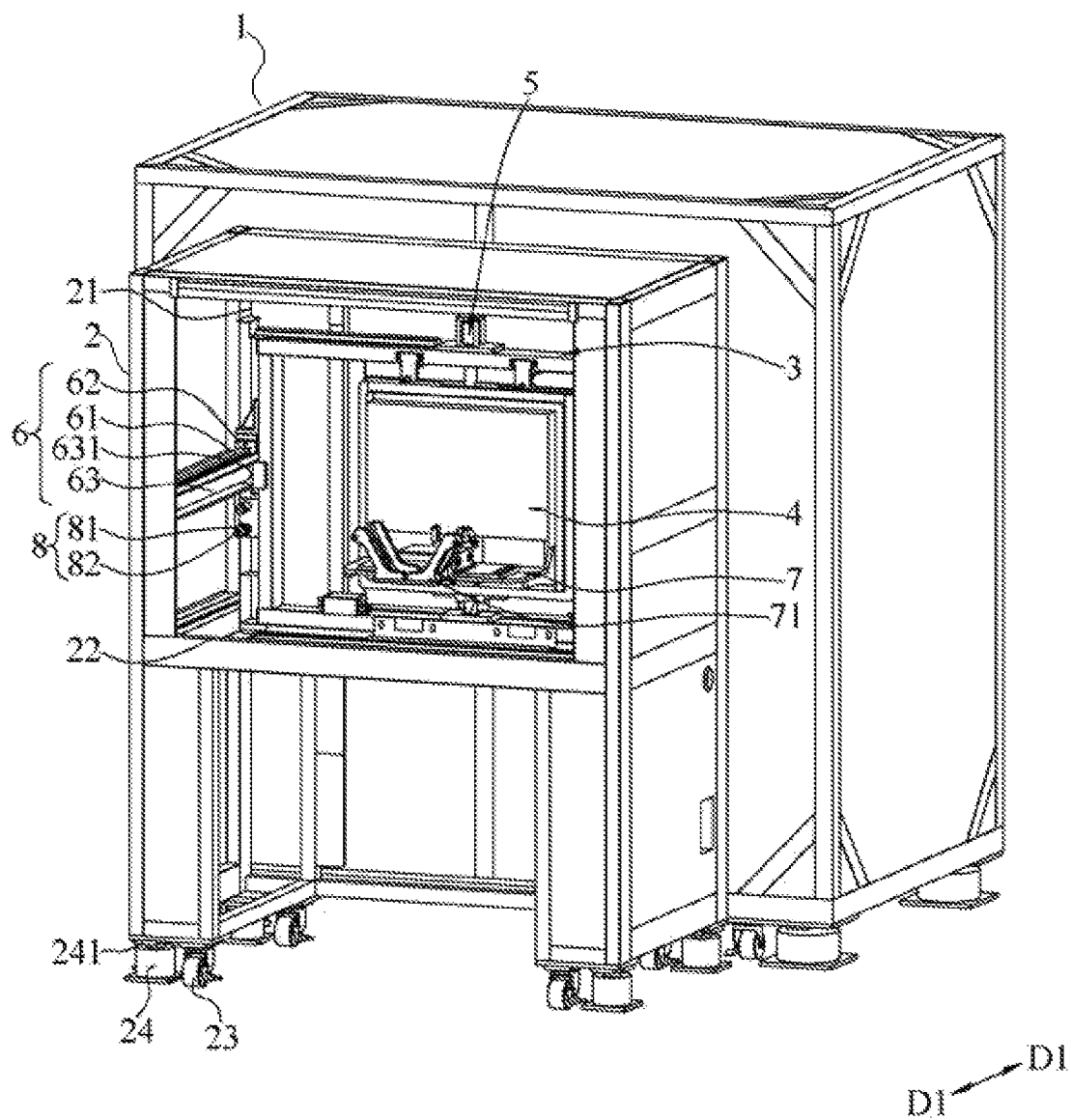
FIG. 2 is a stereoscopic external view according to an embodiment of an acoustic testing apparatus of the present invention.
Figure 3:
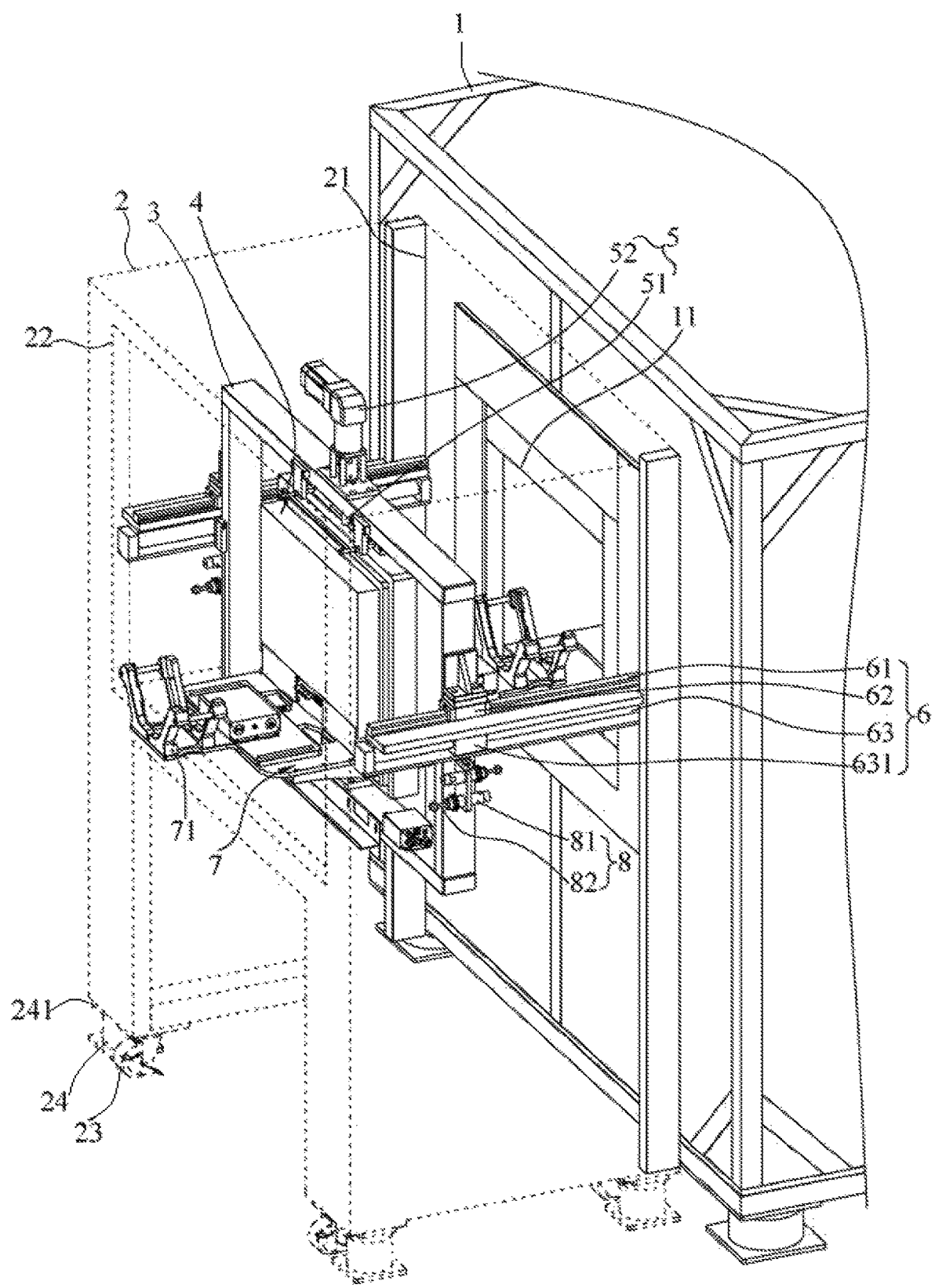
FIG. 3 is another stereoscopic external view according to an embodiment of an acoustic testing apparatus of the present invention.

The acoustic testing apparatus shown in FIG. 2 and FIG. 3 illustrates an embodiment of the invention. The acoustic testing apparatus includes a box body 1, a machine frame 2, a door frame 3, a door body 4, a rotary mechanism 5 and linear displacement mechanisms 6. The box body 1 has a feed-discharge port 11. The machine frame 2 has a first opening 21 and a second opening 22 opposite to each other. The machine frame 2 is disposed on the box body 1, and the first opening 21 communicates with the feed-discharge port 11. The door frame 3 is disposed on the machine frame 2. The door body 4 is disposed on the door frame 3. The rotary mechanism 5 is disposed on the door frame 3 and is connected to the door body 4 to drive the door body 4 to rotate. The linear displacement mechanisms 6 are disposed on the machine frame 2 and are connected to the door frame 3 to drive the door frame 3 to displace between the first opening 21 and the second opening 22 linearly, thus delivering a to-be-tested object (not shown in the figures) to come in and out of the box body 1 from the feed-discharge port 11.

The two opposite sides of the door body 4 are configured to provide to-be-tested objects. The rotary mechanism 5 drives the door body 4 to rotate, thus converting the to-be-tested objects at the two sides of the door body 4 to respectively enter the box body 1 for testing. When a to-be-tested object at one side of the door body 4 is located in the box body 1 and is tested, an operator may take a to-be-tested object at the other side of the door body 4. The test work in the box body 1 may be overlapped with the work time for taking the to-be-tested object outside the box body 1, and thus the test efficiency of the acoustic testing apparatus is improved.

Referring to FIG. 2 and FIG. 3, the box body 1 is a main body for the audio test. In an embodiment, the box body 1 is provided with a test space, and the feed-discharge port 11 is located at one side of the box body 1 and communicates with the test space. A microphone bracket may be configured in the test space. The microphone bracket is configured to provide a microphone to receive a sound of a to-be-tested object in the box body 1 for the audio test. The number of the microphones and positioned ends may be subject to various changes according to the size and type of the to-be-tested object.

In an embodiment, in order to guarantee the accuracy of the audio test performed by the box body 1, the box body 1 has a soundproof characteristic. In this embodiment, the box body 1 is of a hollow quadrilateral cube structure formed by a plurality of surfaces, and each surface is formed by a plurality of material layers by overlapping. The plurality of material layers includes a dense plate layer, a glass fiber layer and a cotton layer. In a specific embodiment, an outermost layer of each surface is a sheet metal layer, and each surface may be provided with the dense plate layer, the glass fiber layer or the cotton layer having the number not limited to one layer from outside to inside. In addition, the dense plate layer, the glass fiber layer and the cotton layer also do not need to be the same in thickness. In this embodiment, in each material layer, the proportion of the thickness of the glass fiber layer is the largest, that of the thickness of the dense plate layer is the following, and that of the thickness of the cotton layer is the smallest. Since each surface of the box body 1 is formed by multiple layers of soundproof materials, the soundproof property of the box body 1 is guaranteed.

Also referring to FIG. 3, the machine frame 2 is configured to carry the to-be-tested objects, the door frame 3, the door body 4, the rotary mechanism 5 and the linear displacement mechanisms 6. Herein, when each to-be-tested object enters the box body 1 for the audio test along with the door frame 3, the to-be-tested object is kept to be located on the machine frame 2. As a result, in order to guarantee the accuracy of an audio test result of the to-be-tested object, the machine frame 2 may be provided with a damping mechanism. Specifically, casters 23 may be disposed at bottom sides of the machine frame 2 so as to move and match different box bodies 1 for use. In addition, a plurality of damping cushions 24 may further be disposed at the bottom sides of the machine frame 2. Each damping cushion 24 has a carrying platform 241. By inflating each damping cushion 24, each carrying platform 241 may be controlled to ascend and descend. When a to-be-tested object is placed into the box body 1 to test, the machine frame 2 may be jointly supported by the carrying platforms 241 of the damping cushions 24, so that the machine frame 2 is supported by the damping cushions 24 and the damping cushions 24 may absorb the vibration possibly generated by the machine frame 2, and thus the stability of the machine frame is improved, the stability of the to-be-tested object is further improved and the accuracy of the audio test is improved.

Referring to FIG. 2 and FIG. 3, in an embodiment, the door frame 3 is a rectangular frame, the left and right sides of the door frame 3 are respectively connected to the linear displacement mechanisms 6, and the linear displacement mechanisms 6 drive the door frame 3 to displace between the first opening 21 and the second opening 22 linearly along a first direction D1.

Specifically, in an embodiment, each linear displacement mechanism 6 includes a linear slide rail 61 and a linear slide block 62. The linear slide rails 61 are disposed on the machine frame 2 and extend along the first direction D1, the linear slide blocks 62 are slidably sleeved to the linear slide rails 61 in a penetration manner, and the left and right sides of the door frame 3 are respectively connected to the linear slide blocks 62. Accordingly, the door frame 3 is moved synchronously with the linear slide blocks 62, and the linear slide rails 61 limit the linear slide blocks 62 to displace linearly along the first direction D1.

In addition, each linear displacement mechanism 6 further includes a pressure cylinder 63. In a specific embodiment, each pressure cylinder 63 is a rodless cylinder. In this embodiment, the pressure cylinders 63 are disposed on the machine frame 2 and extend along the first direction D1, and the pressure cylinders 63 are respectively provided with a kit 631. When an input gas source enters the pressure cylinders 63 or a gas in the pressure cylinders 63 is exhausted, the kits 631 are slid along the first direction D1. The left and right sides of the door frame 3 are respectively connected to the kits 631 of the pressure cylinders 63 of the linear displacement mechanisms 6, so that the pressure cylinders 63 drive the door frame 3 to displace linearly along the first direction D1 under the control of the gas source.

Referring to FIG. 2 and FIG. 3, the door body 4 is of a door leaf structure having an appearance and a shape same as those of the feed-discharge port 11 of the box body 1. The door body 4 is rotatably disposed on the door frame 3. A gap is kept between an exterior outline of the door body 4 and an interior outline of the door frame 3, so that the door body 4 can be certainly rotated within a range of the interior outline of the door frame 3. The door frame 3 may drive the door body 4 to displace along the first direction D1. When the door frame 3 is displaced to a position nearest to the box body 1, the door body 4 may be placed into the feed-discharge port 11 of the box body 1 to seal the feed-discharge port 11 and thus the box body 1 is completely sealed to achieve the best soundproof property. In order to guarantee the soundproof property of the box body 1, in this embodiment, the door body 4 may also be formed by a plurality of material layers same as those of the box body 1.

Figure 4:
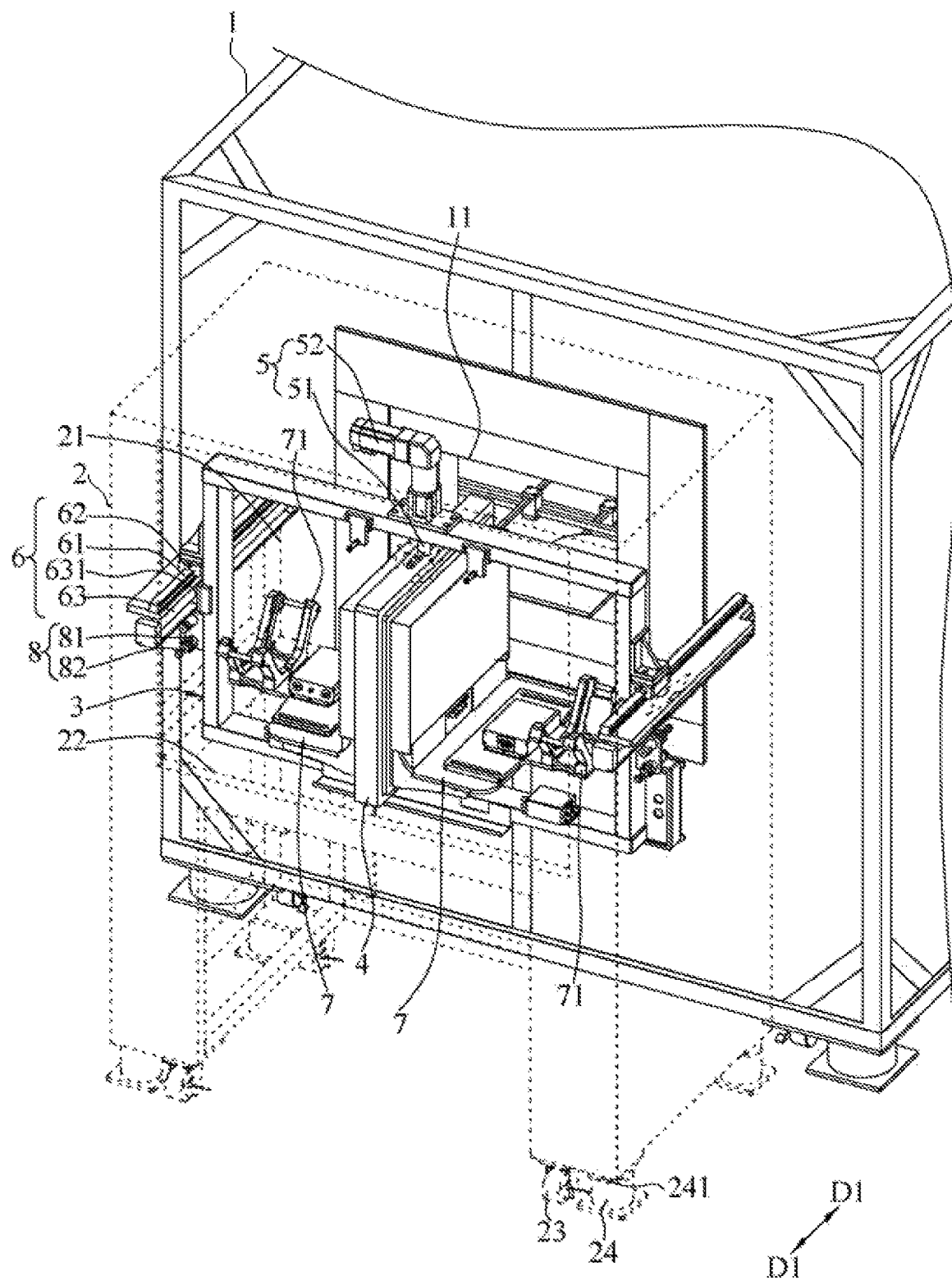
FIG. 4 is a schematic diagram of a rotating state of a door body according to an embodiment of an acoustic testing apparatus of the present invention.

In addition, referring to FIG. 4, a carrying platform 7 is respectively disposed at two opposite sides of the door body 4. In this embodiment, each carrying platform 7 is a plane perpendicular to the door body 4. The carrying platforms 7 perpendicular to the door body 4 are configured to carry the to-be-tested objects, and the to-be-tested objects are placed on the carrying platforms 7 to displace with the door body 4 synchronously. In order to guarantee the stability of the to-be-tested objects, a clamp 71 may be respectively disposed on the carrying platforms 7, and the clamps 71 may clamp and stabilize the to-be-tested objects. Further, fixing holes may be formed on the carrying platforms 7 to fix different sizes of clamps so as to increase the own flexibility and elasticity.

Referring to FIG. 4 again, the rotary mechanism 5 includes a rotating shaft 51 and a drive source 52. The rotating shaft 51 is disposed on the door frame 3 and is connected to the door body 4. The drive source 52 is connected to the rotating shaft 51 to drive the rotating shaft 51 to rotate. When the drive source 52 drives the rotating shaft 51 to rotate, the rotating shaft 51 drives the door body 4 to rotate. In a specific embodiment, the drive source 52 is an alternating-current servo motor.

The use method of the acoustic testing apparatus provided by the present invention will be described as follows. When no to-be-tested object is provided on the carrying platforms 7 at the two sides of the door body 4, the door frame 3 is controlled to displace to a direction of the second opening 22, so that the door frame 3 is located between the first opening 21 and the second opening 22, which is as shown in a state in FIG. 3. At this time, an operator may place a to-be-tested object to the carrying platform 7 at one side, facing to the second opening 22, of the door body 4 from the second opening 22. After the to-be-tested object is placed onto the carrying platform 7, the door frame 3 is controlled to rotate for 180 degrees, so that the to-be-tested object facing to the second opening 22 faces to the first opening 21, and the carrying platform 7 facing to the first opening 21 originally and not provided with the to-be-tested object faces to the second opening 22. Then, the door frame 3 is controlled to displace linearly toward a direction close to the box body 1, when the door body 4 is placed into the feed-discharge port 11 of the box body 1, the to-be-tested object is located in the box body 1, and the audio test can be performed on the to-be-tested object in the box body 1 at this time, which is as shown in a state in FIG. 5.

While the to-be-tested object in the box body 1 is subject to the audio test, the operator may place another to-be-tested object onto the carrying platform 7 facing to the second opening 22 and not provided with the to-be-tested object. At this time, the audio test is performed in the box body 1, and the operator may load and unload the to-be-tested object at the same time. Thereafter, after the audio test is completed for the to-be-tested object in the box body 1, the door frame 3 is controlled to withdraw to be between the first opening 21 and the second opening 22, and is rotated for 180 degrees. Since the to-be-object has been placed on the carrying platform 7 at the other side of the door body 4, the door frame 3 can be controlled instantly to deliver the to-be-tested object to the box body 1 for testing and the operator may also replace the tested to-be-tested object. Therefore, the test work of the box body 1 and the actions of the operator for loading and unloading the to-be-tested objects are not idle; and with the circulation of the above actions, the test work on the to-be-tested objects can be quickly performed.

Then referring to FIG. 3 and FIG. 4 again, in an embodiment, buffers 8 are further disposed on the door frame 3. The buffers 8 provide a buffer capacity when the door frame 3 is close to a final point of a displacement path, so that the impact between the door frame 3 and the machine frame 2 is reduced, the machine frame 2 is prevented from vibrating, and the stability of the to-be-tested objects carried on the machine frame 2 is improved. Specifically, the buffers 8 are respectively disposed at two opposite sides, close to the box body 1 and far away from the box body 1, of the door frame 3 to reduce a displacement speed before the door frame 3 is displaced to be close to or far away from the final point of the path of the box body 1.

In a specific embodiment, each buffer 8 includes a body 81 and an axle center 82. A buffer medium is accommodated in each body 81. One end of each axle center 82 is stretched into the body 81 to contact the buffer medium, and the other end of each axle center 82 is stretched out of the body 81 and faces to the machine frame 2. When the machine frame 2 contacts the axle centers 82 of the buffers 8, the axle centers 82 are stressed and apply a force to the buffer media, and the buffer media can provide a buffer force for the axle centers 82, thus achieving the buffer effect. Further, the buffer media of the buffers 8 each may be but not limited to a spring, a gas or a liquid.

Figure 5:
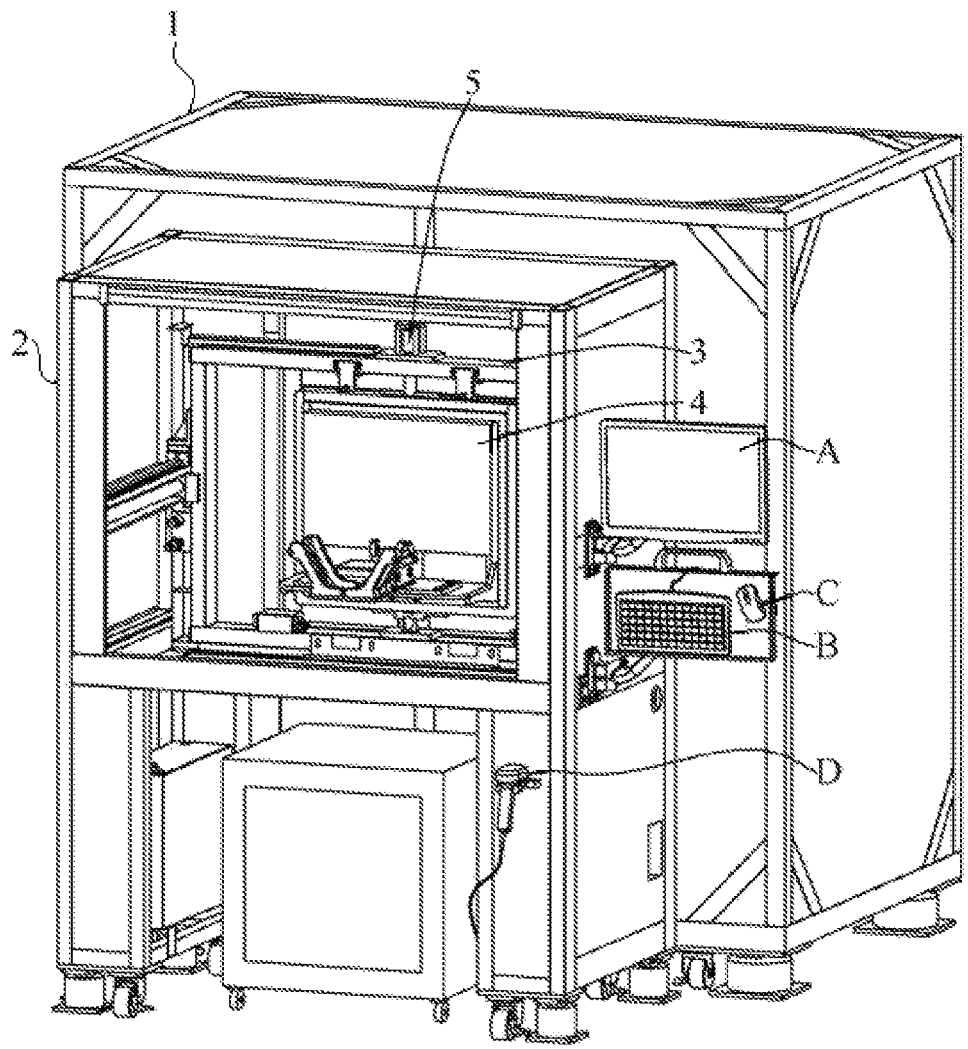
FIG. 5 is a schematic diagram according to another embodiment of an acoustic testing apparatus of the present invention.

Referring to FIG. 5, in a specific embodiment of the present invention, the acoustic testing apparatus may further be cooperated with other auxiliary devices to facilitate the test work of the operator. In this embodiment, a display A, a keyboard B, a mouse C and a scanner D are disposed on the machine frame 2. The scanner D may scan, before a to-be-tested object is tested, a barcode on the to-be-tested object to quickly obtain a type or specification of the to-be-tested object. The display screen A may display various types of detection information in a detection process in real time. The keyboard B and the mouse C may be used by the operator to select or input the required information in the detection process. With such a configuration, the completeness of the detection function is further improved.

In conclusion, according to the acoustic testing apparatus provided by the present invention, the test efficiency may be improved, and the idleness and time consumption of the operator or the detection device are reduced simultaneously.

The present invention has been disclosed as above in the embodiments but is not intended to limit the present invention. Any person skilled in the art may make a few changes and modifications without departing from the spirit and scope of the present invention. Therefore, the protection scope of the present invention should be subject to the scope defined by the appended claims.

The invention claimed is:

1. An acoustic testing apparatus, comprising:
    a box body, having a feed-discharge port;
    a machine frame, having a first opening and a second opening opposite to the first opening, the machine frame being disposed on the box body, and the first opening communicating with the feed-discharge port;
    a door frame, disposed on the machine frame;
    a door body, disposed on the door frame;
    a gap between the door body and the door frame;
    a rotary mechanism, disposed on the door frame and connected to the door body to drive the door body to rotate within the door frame; and
    a linear displacement mechanism, disposed on the machine frame and connected to the door frame to drive the door frame to displace between the first opening and the second opening linearly.

2. The acoustic testing apparatus according to claim 1, wherein the rotary mechanism comprises:

a drive source; and a rotating shaft connected to the drive source and the door body.

3. The acoustic testing apparatus according to claim 2, wherein the drive source is an alternating-current servo motor.

4. The acoustic testing apparatus according to claim 1, wherein the linear displacement mechanism comprises a pressure cylinder connected to the door frame.

5. The acoustic testing apparatus according to claim 4, wherein the linear displacement mechanism comprises:

a linear slide rail disposed on the machine frame; and a linear slide block sleeved to the linear slide rail in a penetrating manner, wherein the pressure cylinder is connected to the door frame and the door frame is connected to the linear slide block.

6. The acoustic testing apparatus according to claim 1, further comprising two carrying platforms respectively disposed at two opposite sides of the door body.

7. The acoustic testing apparatus according to claim 6, further comprising two clamping tools respectively disposed on the two carrying platforms.

8. The acoustic testing apparatus according to claim 1, wherein the door body is formed by a plurality of overlapping material layers.

9. The acoustic testing apparatus according to claim 8, wherein the plurality of material layers comprise a dense plate layer, a glass fiber layer and a cotton layer.

10. The acoustic testing apparatus according to claim 1, further comprising a buffer disposed on the door frame.

11. The acoustic testing apparatus according to claim 10, wherein the buffer comprises:

a body;

an axle center;

a buffer medium accommodated in the body, wherein an end of the axle center is stretched into the body to contact the buffer medium, and another end of the axle center is stretched out of the body and faces the machine frame.

12. The acoustic testing apparatus according to claim 11, wherein the buffer is a spring, a gas or a liquid.

* * * * *